United States Patent Office 2,956,962
Patented Oct. 18, 1960

2,956,962

VISCOSITY STABILIZATION OF LATEX EMULSION PAINTS CONTAINING PROTEINS BY INCLUSION THEREIN OF ALDEHYDES

Samuel P. Wise, Deer Park, and Betty Oberdorfer Straus, Norwood, Ohio, assignors, by mesne assignments, to The Sherwin-Williams Company, a corporation of Ohio No Drawing. Filed May 24, 1955, Ser. No. 510,842

22 Claims. (Cl. 260—8)

This invention relates to a method for maintaining the viscosity of a protective colloid containing oil-in-water emulsion type latex paint against deterioration in viscosity with age of the emulsion product through use of aldehydes.

The last score of years are witness to a tremendous growth in the development and use of emulsion type coating compositions. Their success is attributable to many well known and well understood factors. Perhaps the most outstanding characteristic of the present day emulsion paints resides in the ability of the painter to clean up brushes, equipment and occasional spots resulting from accident with soap and water, commodities available in every household. Thus far manufacturers of this type of coating composition have experienced such remarkable sales that products have not aged for extensive periods on shelves of dealers due to the rapid turnover of merchandise. However, it is well known to research and development workers in the field of latex emulsion paints that a serious defect is inherent in use of aqueous protein dispersions as protective colloids to stabilize phase relationships of emulsion paints. It is less well known that the synthetic protective colloids also contribute to viscosity instability. It is well established that protective colloids are a practical essential in the formulation of pigmented oil-in-water emulsion type coating compositions. The protective colloid serves the function of preventing emulsion breakdown prior to and during application of the liquid coating. A protective colloid appears to be essential to obtain and maintain the excellent working quality of oil-in-water emulsion paints.

This application is concerned primarily with use of vegetable proteins as protective colloids in latex emulsion paints. However, it has also been determined that synthetic protective colloids including sodium polyacrylate, sodium carboxymethyl cellulose, polyvinyl alcohol, water soluble alginates, methyl cellulose, hydroxyethyl cellulose, etc., provide emulsion paints whose viscosity tends to increase with package age. Use of aldehydes has been found to level off this undesirable feature when synthetic protective colloids are used and provides a paint product of improved viscosity stability with age in the package.

Counting votes in the market place, the public appears to strongly favor emulsion paints which are stabilized with protective colloids comprising essentially aqueous dispersions of vegetable proteins. In the early days of the emulsion paint development, casein was used almost exclusively for this purpose. With the advent of World War II, casein became short in supply and other proteinaceous substances derived from vegetable sources were investigated. Among the vegetable proteins useful in stabilizing emulsion paints are soya bean protein, corn protein, cotton seed protein, wheat protein, and combinations thereof. The aforementioned proteins are most often dispersed in an aqueous alkaline medium. More recently proteins have been developed from some of these sources which do not require addition of alkaline substances in order to obtain smooth colloidal aqueous dispersions suitable for protective colloidal use. Means of dispersing proteins in aqueous carriers are well known. Most commonly, vegetable proteins are dispersed by means of alkali or alkaline reacting addition agents. Alkaline reacting addition agents include caustic soda, ammonia, amines, alkali metal borates, alkali metal silicates, etc. Each particular alkaline reagent has its followers and supporters.

Examination of latex emulsion paints stabilized with aqueous dispersions of vegetable proteins reveals that all available suffer the unfortunate experience of losing viscosity with age in the package, or shelf age. This defect, as previously indicated, was early recognized and a considerable amount of research is known to have been expended in an effort to overcome this frailty. The art is replete with suggested means of meeting the problem. Past attempts to stabilize emulsion paints and the methods proposed are indicated by reference to the following patents, which are not intended to be inclusive but illustrate innovations in practice over the years.

U.S. Patent No. 2,308,474 recognizes that changes take place in casein which result in the lowering the viscosity of the solution. There the completed emulsion paint is heated below 100° C. until its viscosity has decreased to a constant value. Thereafter the paint is stabilized at that viscosity value by addition of a particular gel-forming agent, namely; a water soluble cellulose ether.

U.S. Patent 2,047,143, an early one relating to the general art, claims viscosity stability in emulsion paint by inclusion therein of a water soluble soap of a glyceral phthalate resin.

In U.S. Patent 2,154,362 paints made from casein and its equivalent protein substances are recognized to lose viscosity. The inventor believes deterioration to be caused by a progressive alkaline hydrolysis. The inventor claims that alkali salts of amphoteric metals are effective in stabilizing viscosity with age of the completed protein containing product.

In U.S. Patent 2,279,387 the loss-of-viscosity problem is recognized and the method suggested of heating the aqueous casein dispersion until it reaches a constant viscosity and adding thereafter a particular gel-forming agent, namely; a water soluble alginate.

U.S. Patent 2,531,383 recognized the problem in maintaining the viscosity of aqueous dispersions of cotton seed proteins and claims the addition of reducing sugars has considerable merit.

More recently, U.S. Patent 2,613,155 recognizes the problem of protein viscosity stability in aqueous solution or dispersion and discloses that solubilizing casein with urea and ammonium thiocyanate in combination with an alkaline earth compound overcomes the difficulty and increases the working life of protein dispersions.

Thus, as can be seen from a survey of the prior art as discussed above, the problem of stabilizing protein containing aqueous coating compositions is extremely old. None of the methods heretofore suggested by the prior art provide a satisfactory means of obtaining a latex emulsion paint containing a vegetable protein which may be stored on a shelf for an indefinite period of time without serious loss in viscosity. Loss in viscosity of a latex paint system with time is important, for not only are the application characteristics of the paint product depreciated, but the usefulness of the emulsion system itself (which has relation to the ultimate over-all satisfaction of the paint system upon and after application) is at stake. Storage at higher temperatures aggravates viscosity loss.

The object of this invention is to provide means of stabilizing the viscosity of protective colloid containing oil-in-water latex emulsion paints so that the viscosity will maintain relatively constant value over long periods of time.

The object of this invention has been accomplished by a particular means and order in the preparation of the emulsion paint system. Emulsion paint systems of interest to this disclosure contain the following essential ingredients:

(1) A protective colloid which comprises a water dispersed vegetable protein preferably, but certain synthetic colloids are included.
(2) An aqueous continuous phase.
(3) A discontinuous oil phase comprising a paint latex.

Other components may be, and usually are, included to accomplish various purposes.

A study of the prior art will show two general types of materials suitable for the protective colloid portion of emulsion paint systems. Primarily, and in the largest number of cases, an aqueous colloidal protein dispersion is used as the protective colloid. Secondarily and more recently, water-soluble modified celluloses, along with other water-dispersible natural gums, are coming into prominence. Synthetic protective colloids have been and are used alone, or in conjunction with protein dispersions. These too, as indicated, fail to provide constant viscosity with paint product age. The growth and use of these latter materials is directly attributable to the more serious problem of stabilizing the viscosity of protein solutions as compared with these synthetic colloids.

The oil phase originally was a simple vegetable seed drying oil, e.g., linseed oil. With the development of interest in emulsion coating compositions, the simple linseed oil formulation was superseded by the use of heat bodied oils. A natural growth into the use of oleoresinous compositions of liquid nature wherein resins were dispersed in the treated oils followed. More recently with the availability of oil-modified alkyd resins, the trend was to the use of these and other synthetic resinous vehicles as the disperse, or oil, phase of emulsion paint systems.

Following the tremendous growth in the use of emulsion copolymers in the manufacture of synthetic rubber, it soon became apparent that it was possible to use an emulsion copolymer solely as the disperse phase or in conjunction with the prior art oil type discontinuous phase. In some cases the older oil phase has been entirely displaced by emulsion copolymers. Emulsion copolymers may be generally referred to as latices having historic origin in the natural rubber latices available from rubber trees. Unavailability of natural rubber due to war shortages stimulated development of emulsion copolymers in the manufacture of synthetic rubber. Most notably successful of this class were those produced by emulsion copolymerization of styrene and butadiene in the manufacture of GRS type synthetic latex. GRS latex is rich in butadiene and lean in styrene. When used as a protective coating it produces a somewhat soft product generally unsuited for use in latex emulsion coating compositions. Research has indicated that when reverse quantities of styrene and butadiene are combined by similar emulsion copolymerization techniques, a rubber-like latex of great value in emulsion type coating compositions is produced. Other emulsion polymer and copolymer systems also became available as a result of the increased tempo in emulsion polymerization research. Vinyl acetate, for example, was developed and used by the Germans due to the scarcity of natural oils in the manufacture of paints. Acrylic type emulsion copolymers became available and are now being used successfully in the production of decorative paints. Vinyl chloride copolymers are the subject of considerable research leading to the development of protective coatings having requisite properties for specific application purposes. Copolymers of vinyl acetate and vinyl butyrate appear to have a sphere of usefulness in the emulsion paint field.

From the above background it can be seen that there has been a natural progression from the early days, wherein a simple drying oil was used as the disperse or oil phase in oil-in-water emulsion paints to the present where many synthetic polymeric materials and particularly those produced by emulsion polymerization techniques, have been used as the disperse oil or binder phase of emulsion paint systems.

The art of emulsion polymerization has reached practical utilization only recently and the patent art on the subject has been enriched tremendously since the rubber shortages of World War II. While pooling of general information by those working in the field has been generally practiced, much of the specific information on actual emulsion polymerization techniques known to specific groups in the art is still not generally available. Further, the great interest and emphasis in that art has been in the production of elastomers in bulk form for use as a replacement for rubber, e.g. in the massive form, and not for purposes of protective and decorative coatings. Presently, therefore, definitions of all the qualities and characteristics of emulsion polymers useful for coating purposes cannot be set forth as the art is relatively new. For this reason, the term "paint latex" is used herein to refer to emulsion polymer systems useful for the purposes of this invention. This, for the reason that language in this art as it relates to the subject at hand is, like the art, quite undeveloped. These latices are also referred to, as previously indicated, as "reverse rubbers" for the reason that the proportions of aromatic vinyl compound and diolefin are in reverse ratio to the usual copolymer rubbers used in massive form for the manufacturing of tires, etc.

The term "paint latex" or "reverse rubber latices," as adapted herein, refers to the concept of a dispersed phase polymer formed or polymerized in an aqueous carrier, the oil-in-water type emulsion resulting having specific physical characteristics and preferably certain chemical constituents, as herein set forth.

More specifically, the term "paint latex" or "reverse rubber latex" includes particularly products of emulsion polymerization. The emulsion polymers produced from two or more unsaturated polymerizable components in the presence of surface active agents of nonionic and anionic character as stabilizers and one or more per-compounds, e.g., peroxides, persulfates, etc. as accelerators of polymerization in such manner and proportions as to form an aqueous emulsion polymer system producing the preferred latices. All of the paint latices of interest to this invention which have been examined in detail have a particle diameter of the disperse phase in excess of 0.2 micron and preferably from 0.2 to about 0.4 micron. The pH of the aqueous phase is from 7.5 to 11 and preferably from 8.0 to 10, and the water content is not more than 60%, usually from 45 to 55%, of the total weight of the emulsion polymer. A further essential characteristic of materials included in the term "paint latex" is that the latex or blend of two or more latices to qualify for paint and related coating usage and to bear the name "paint latex" shall be capable of agitation in a malted milk-type drink mixer (Drink Master Model #30, Hamilton Beach Company), at a rate of rotation of the agitator of 12,000 r.p.m. for one-half hour without showing graining, viscosity change or other characteristic evidences of emulsion breakdown. Latices not meeting the above specifications are not useful for coatings and are excluded from the scope of the term "paint latex" as used herein.

Presently, the most useful paint latices are copolymers and terpolymers comprising monovinyl aromatic hydrocarbons containing a single reactive center of polymerization and aliphatic conjugated diolefines containing not more than 60 mol percent of the aliphatic conjugated diolefine. Latices within this class are described in U.S. Patents 2,498,712 and 2,479,967. The term "paint latex" includes the product of a single emulsion polymerization, or a blend of two or more emulsion polymerization products. However, to qualify as a paint latex, the single product or the blend of oil-in-water emulsion products utilized as the paint latex must be capable (of itself or after having been plasticized) of depositing a continuous film from the disperse polymer containing phase.

Having thus described the scope of the term "paint latex" as accurately as the present state of knowledge concerning this class of composition will allow, the term shall be understood to include all of the limitations as herein set forth.

As is presently known, most of the paint latices available from commercial latex producers using emulsion polymerization techniques employ principally butadiene-1,3 as the aliphatic conjugated diolefine and styrene as the aromatic vinyl compound containing a single reactive center of unsaturation as the essential monovinyl aromatic hydrocarbon. Vinyl toluene is substituted for styrene and isoprene can be used in lieu of butadiene. A more recent paint latex found useful and available commercially includes the polyalkylacrylate latex emulsions (AC-33 of Rohm & Haas). Paint latices of acidic nature are generally not suitable for the purposes of this invention and it is preferred to keep the pH of the paint system at a minimum of 7 so that the system does not become acidic, generally at a higher level of 7.5 to not appreciably more than about 9.5. This is the usual pH range of most protein stabilized emulsion paint systems of commercial importance today.

General developments in the synthetic detergent and wetting agent field have also played a prominent role in the development of commercially successful emulsion paint coatings. These materials form a very important part of the aqueous phase of the emulsion system and many of the wide variety of synthetic detergents have found application as emulsifying agents in emulsion paint technology. Some confusion exists relative to terminology in referring to emulsion paints. There is a tendency in the art to confuse emulsifiers with protective colloids and often aqueous protein dispersions are referred to as emulsifying agents. It is artificial to say that these substances do not play an important part in emulsification and it may well be that they too act as emulsifiers and surface tension depressants.

Use of surface tension depressants as emulsifying agents in emulsion paints is well established and the kind and selection of emulsifier for a particular paint system is well within the skill of the emulsion paint formulator. Selection of emulsifiers is carefully made in order to obtain the best combination of disperse oil phase, continuous aqueous phase and aqueous protective colloid in order to obtain optimum working quality in the final paint product.

However, for purposes of this specification, we make a clear differential between materials used in small quantity in the aqueous phase as emulsifying agents, of which the synthetic detergents are illustrative, and agents characterized by a relatively small molecular weight, as compared to the vegetable proteins of the aqueous phase and which we refer to as protective colloids. It is characteristic of the protective colloid portion of emulsion paint systems that they tend to form viscous physical structures in relatively small concentrations when dispersed in water and are of relatively high molecular weight and of complex chemical structure.

Other agents are well known as essential in the aqueous phase in order to provide a paint product having suitable package life. These additives are generally referred to as preservatives and include toxicants effective against microbiological forms of life. Aqueous protein dispersions are well known to provide a suitable environment for the growth of many forms of molds and bacteria which, if not arrested in growth, cause myriad problems. Among these problems are gassing in the container, foul odors, emulsion breakdown, odor upon application and support of mold growth on walls after application. Compounds useful for the purpose of sterilizing protein dispersions are also well known. Included among those most often used commercially are the sodium salts of phenols and chlorinated phenols, thymol, sodium silicofluorides, sodium salicylate, sodium fluoride, certain mercurials, borax, pine oil, etc. The general pre-requisites of a satisfactory emulsion paint system are now quite well established in the art and the above general discussion serves merely to establish the state of the art and a locus of the present invention.

It is the primary object of this invention to provide a means of stabilizing the viscosity of protein and synthetic colloid containing latex emulsion paint systems over prolonged periods of time.

This object is accomplished by timely addition of not less than one percent by weight of the dry protein content of the paint of an aldehyde, or a donor compound capable of releasing an aldehyde under the conditions of emulsion paint manufacture. Experience indicates that a first requisite is that the aldehyde have a reasonable water solubility and is of aliphatic nature and secondly that the addition of the aldehyde to the system is timely.

Proteins are giant "hybrid" molecules containing hydrophilic and hydrophobic side chains or groups. When in aqueous dispersion it is believed that the protein molecules are associated in bundles of molecules called micelles, which are in relatively free linear arrangements. When aqueous vegetable protein dispersions are in association with dispersed copolymers similar to paint latices, the hydrophobic side chains of the protein (isoleucine for example) are attracted and directed towards the latex phase whereas the hydrophilic chains (lysine for example) are directed towards the continuous aqueous phase.

With the above concept in mind it can be seen that the balance of hydrophobic and hydrophilic chains in the micelles of dispersed protein or the hydrophile-hydrophobe balance is of importance in understanding the behavior of proteins when in complex emulsion paint systems.

The vegetable proteins included as protective colloids in emulsion paints are considered to have an overbalance of hydrophilic groups. The hydrophilic groups in turn are evidently more strongly polar than the hydrophobic groups, consequently, orientation of the protein micelles is such that forces prevailing tend to pull the protein micelles more strongly in the aqueous interface. Upon introduction of a paint latex into an aqueous protein dispersion it is believed that the hydrophobic groups of the protein micelle are attracted to the surface of the hydrophobic latex particles and that this attraction spreads the more polar protein about the less polar oilophilic surface of the latex particles. Concurrently, the more hydrophilic groups of the protein micelles are drawn toward and into the aqueous phase.

The relatively stronger attraction of the more polar exterior hydrophilic side chains, exteriorly of the latex surface, for the aqueous phase is believed to cause, with the passage of time, a rolling up or aggregation of the latex-protein combination into condensed, relatively spherical masses. More spherical masses theoretically decrease the viscosity of the system which results with age.

Consideration of the changes in state when aldehydes are combined with proteins, as in the prior art practice, follows: In the absence of hydrophobic surfaced latex particles, forces orienting the protein micelle about the particles of latex are, naturally, nonexistent. Cross-linking between aldehyde and amino groups of the protein micelle explains gelation which usually follows. After ageing, or upon heating, the initial, labile, cross-linking of protein-aldehyde groups alters to a permanent form. The protein is, after that initial period, considered to be irreversibly denatured. Gelation of the protein destroys the liquidity essential to paint application. It is also reasonable to assume that gel structures formed initially upon mixing aldehyde and protein decrease the mobility of the protein micelles and interfere with their spreading about subsequently added latex particles. At any rate, data from a series of tests indicates that viscosity stability of emulsion paint systems is not materially enhanced unless the protein and latex have an opportunity to become intimately associated prior to reaction of aldehyde and hydrophile groups of the protein. Intimate latex-protein association is assured if the aldehyde is added either concurrently with or not later than a reasonable time subsequent to addition of the latex to the aqueous protective colloidal (protein) phase of the emulsion paint system.

When aldehyde and latex are added to the aqueous protective colloid simultaneously, the spreading of the protein about the latex particle appears to take place preferentially and prior to the aldehyde-protein condensation and thereby to effect a marked change in the viscosity behavior of the system with package age. Observable results so far obtained appear similar if the aldehyde is added within a reasonable time subsequent to the paint latex. However, addition of aldehyde should not be too long delayed in order to obtain optimum results. If the paint system is at elevated temperature, naturally the time of delay can be less lengthy. Time of delay of the order of fifteen to thirty minutes has, for example, not unreasonably interfered with accomplishment of the objectives of the process.

If aldehyde is not added to the protein dispersion concurrently with or within a reasonable time subsequent to the paint latex, aggregation or curling up occurs and the viscosity of the completed paint product drops off with storage age.

If the aldehyde is added within a timely interval, however, the latex particles are believed first to be protein coated and the strongly polar hydrophile groups of the protein micelles to be thereafter acted upon by the aldehyde to render the micelles of protein less hydrophilic and more hydrophobic, less polar, and with a markedly less tendency to aggregate, pull away and curl up than before aldehyde addition. Like building a cross-bracing underneath a structure, cross-linking prevents curling and consequent viscosity loss as the molecule can no longer develop into more streamlined spherical molecular configuration. Thus the preferred time of addition in the time order of emulsion paint manufacture is such that the protein and non-aldehyde binding components have been thoroughly incorporated before the addition of the aldehyde. The aldehyde is added not earlier than concurrently with the paint latex addition nor earlier than concurrently to the dilution of the aqueous protein component by addition of some portion of the paint latex, but the aldehyde is added not later than before incorporation of the aldehyde binding components to the paint system, illustratively, urea.

This invention provides, then, in its preferred form, an aqueous vegetable protein containing, oil-in-water latex emulsion paint characterized by practical viscosity stability over prolonged time intervals and comprises an aqueous colloidal vegetable protein dispersion as the primary protective colloid in the continuous phase, a disperse hydrophobic water insoluble oil phase comprising an emulsion copolymer paint latex and in immediate reactive contact with said pre-formed emulsion system, a water soluble aliphatic aldehyde in a quantity insufficient to destroy fluidity of the aqueous protein dispersion but sufficient to prevent deterioration of viscosity with time.

It is difficult to define a range of quantity of aldehyde (or aldehyde donors which are equivalent under certain conditions of aldehyde liberation to yield aldehydes) which is inclusive, for the individual formulations of paint latex-protein stabilized (or synthetic protective colloid stabilized) emulsion paints are widely variable. It has been established that the useful aldehydes within the class herein defined vary somewhat in their behavior. However, the following observations will make clear preferred practice in use of the invention as to quantity of aldehyde.

If formaldehyde is selected as the aldehyde, from 1% to 10% of formaldehyde based on protein solids or dry protein has been found useful. However, from 2% to 5% appears adequate to accomplish the ends of the invention. These figures have been based on latex emulsion paints which were free of all aldehyde binders with the exception of the protein component. If aldehyde binders, of which urea is an example, are present, more aldehyde may be essential. As one exceeds a 5% level the danger of adverse gelation of the latex paint increases. Paraformaldehyde may be used directly as a formaldehyde substitute, based upon the calculated formaldehyde content.

Acrolein will give good results at slightly higher percentages. Five to ten per cent of acrolein has given satisfactory stabilizing effect without tendency toward gelation in the package.

Glyoxal has been found somewhat sluggish in performance, but entirely useful over a 4 to 8% range based on the dry protein weight. Above 8%, unless aldehyde binders are present in the emulsion paint formulation, there is a strong tendency to excessive thixotropy when using glyoxal, particularly at higher storage temperatures.

Test paints including pyruvic aldehyde were found useful at a higher level of 11.5% without gelation.

If aldehyde binding substances are present, prior to the addition of the aldehyde to the protein-paint latex dispersion, it appears as though the aldehydes are removed from contact with the protein molecules and unless used in effective quantity to overcome aldehyde binders, the adjuvant fails to accomplish the end purpose of the invention.

Among constituents which may be present in emulsion paints and which are known to remove or bind aldehydes are: oxidizing agents; reactants with which aldehydes condense to form polymers including amines, amides, phenols, alcohols, etc. Ammonia, for example, removes formaldehyde in formation of hexamethylene tetramine.

Conversely, certain bound aldehyde compositions will break down to again release aldehydes. Exemplary is hexamethylene tetramine, the above-mentioned reaction product of ammonia and formaldehyde, which will release aldehyde at elevated temperatures. As some emulsion paints are made at elevated temperatures, this compound is illustrative of an aldehyde donor under certain conditions.

Experience has indicated that aldehyde binders may be added subsequent to addition and combination of aqueous vegetable protein and latex plus aldehyde without interference with the effectiveness of the aldehyde for the purposes of the invention. To illustrate, one of the essential components of a preferred latex emulsion paint is an added quantity of urea to protect the product from breakdown due to alternate freezing and thawing (see U.S. Patents 2,683,699 and 2,683,700). Addition of urea to the emulsion paint prior to latex and aldehyde inhibits action of the aldehyde. Addition of urea subsequent to latex-aldehyde addition does not interfere and compensating quantities of aldehyde are not required. Thus it is possible to secure both the advantage in viscosity stability as well as freeze-thaw cycle resistance in the same latex emulsion paint product.

To summarize, then, the aldehydes useful for the purposes of the invention have been found to include the water-soluble aliphatic aldehydes. Aldehydes having more than five carbon atoms are generally water insoluble and of little utility for purposes of the invention.

There are some exceptions and it is difficult to define the aldehyde by other than its aliphatic nature and water solubility. To illustrate, butyraldehyde and crotonaldehyde are both four carbon atoms in size, yet crotonaldehyde is quite water soluble and effective while butyraldehyde is water insoluble and not useful for the purposes of the invention. On the other hand 2-hydroxy adipaldehyde which is of considerably greater molecular size is considerably more effective than adipaldehyde because of its greater water solubility. Aldehyde equivalency appears, therefore, to hinge upon water solubility or availability in the aqueous phase. Specific water-soluble aliphatic aldehydes found useful for the purposes of this invention include formaldehyde, formalin, paraformaldehyde, glyoxal, acetaldehyde, acrolein, propionaldehyde, crotonaldehyde, pyruvic aldehyde, 2-hydroxy adipaldehyde, etc. Aromatic aldehydes, such as benzaldehyde and cyclic aldehydes, such as furfural, are ineffective for the purposes of the invention. The quantity essential will vary appreciably depending upon the other components of the latex emulsion paint. This for the reason that some components are known to tie up or bind aldehydes. Exclusive of potential aldehyde binders in the composition, a guide is the use of from 1% to not appreciably more than 12% of aldehyde based upon the dry weight of protein present in the emulsion paint. With longer carbon chain aldehydes, more aldehyde may be tolerated as explained above. Thus the phrase defining the quantity of aldehyde essential to the ends of the invention as a viscosity stabilizing quantity but insufficient to destroy the fluidity of the paint system may be more than 12% if aldehyde binders are present, or if less reactive aldehydes are selected. Very practically, from 2% to 5% of formaldehyde as paraformaldehyde (in excess of the quantity to react with aldehyde binders) meets the requirements of the best mode of practicing the invention. Other aldehydes and higher percentages are merely definitive of the scope of the invention. Aldehyde donors, under the conditions of paint manufacture, are of course equivalent to aldehydes for the purposes of the invention.

The above described composition of matter is brought into being by dispersing the paint latex oil phase of an oil-in-water emulsion paint in an aqueous medium comprising a vegetable protein dispersion as the principal protective colloid and not earlier than concurrently with nor later than a reasonable time subsequent to the dispersing of said latex emulsion in said aqueous protein dispersion, adding to the said system a quantity of a water-soluble aliphatic aldehyde in a sufficient quantity to stabilize the viscosity of the emulsion system but insufficient to destroy the fluidity of said aqueous protein dispersion.

The folowing examples illustrate a number of methods of applying the invention and some of the limitations in its practice. It is not intended that limitations be read into the foregoing description and the following examples except insofar as the limitations therein are specifically pointed out. Certain proteins are not operable and include such animal proteins as casein and the hydrolyzed collagens as are derived from animal tissues, e.g. gelatine and glue.

EXAMPLE 1

*(Pigment dispersion)*

The following ingredients were thoroughly mixed together:

5 parts sulfonated tallow
140 parts water
2 parts tetrasodium pyrophosphate
2½ parts pigment dispersing agent (Tamol N, the sodium salt of a condensation product of naphthalene sulfonic acid and formaldehyde)
2½ parts sodium salt of an alkyl aryl sulfonic acid (Nacconol NRSF)
50 parts lithopone
240 parts titanium dioxide
20 parts water ground mica
20 parts dry ground mica
35 parts calcium carbonate
15 parts diatomaceous earth
50 parts kaolin
½ part carboxymethyl cellulose After thorough incorporation, the paste was smoothed by passage through a zone of high shear (Hy-R Speed Mill).

EXAMPLE 2

*(Vegetable protein dispersion)*

Unless otherwise noted, the aqueous vegetable protein dispersions used as protective colloids in the following examples were made as follows:

410 parts water are heated to 80° C. in a suitable sized stainless steel container equipped with heating and agitation means and a cover. Thereafter—

55 parts of selected vegetable protein are added, and stirred 5 minutes at 80° C. (Drackett Soya Bean Protein #220).

6.5 parts sodium orthophenyl phenate and 6.5 parts sodium pentachlorophenate, are stirred into the slurry for five minutes at 80° C.

2.3 parts sodium hydroxide pellets in 15.0 parts water are added and stirring continued for an additional ten minutes at 80° C.

4.6 parts $H_3BO_3$ are sifted into the dispersion ten minutes after caustic addition. Stirring and 80° C. temperature are maintained for an additional ten minutes.

EXAMPLE 3

Prepared as in Example 2, where the vegetable protein was a soya bean protein (Drackett Protein 220, lot 545).

EXAMPLE 4

Prepared as in Example 2, where the vegetable protein was a soya bean protein (Glidden alpha protein).

EXAMPLE 5

A series of solutions were prepared using synthetic protective colloids as follows:

(a) 2% sodium polyacrylate in water (Acrysol GS)
(b) 2% sodium carboxymethyl cellulose (high viscosity grade) in water
(c) 2% hydroxyethyl cellulose in water (Cellosize WP)
(d) 2% polyvinyl alcohol in water (Elvanol 72–51)
(e) 2% sodium alginate in water (Kelgin)
(f) 2% 4,000 cps. methyl cellulose (Methocel 4000)

EXAMPLE 6

292.5 parts pigment dispersion (Example 1)
90.9 parts protein solution (Example 3)
192.5 parts 67% styrene–33% butadiene emulsion copolymer paint latex (Dow 762–W)

were thoroughly blended together, the paint latex being added last and stirred for a ten minute period. A considerable number of batches were made over this formula and used as controls in a series of tests. The above example was also repeated, adding the following aldehydes in the following strengths and amounts:

| Example No. | Aldehyde | Strength, percent | Amount, parts.wt. |
|---|---|---|---|
| 7 | Formalin | 40 | 0.6 |
| 8 | do | 40 | 1.2 |
| 9 | do | 40 | 2.4 |
| 10 | do | 40 | 3.6 |
| 11 | Acetaldehyde | 100 | 1.4 |
| 12 | do | 100 | 2.1 |
| 13 | Acrolein | 100 | 0.9 |
| 14 | Benzaldehyde | 100 | 1.7 |
| 15 | Paraformaldehyde | 100 | 0.5 |
| 16 | do | 100 | 0.8 |
| 17 | Pyruvic | 100 | 3.1 |
| 18 | Glyoxal | 30 | 1.4 |
| 19 | do | 30 | 2.8 |
| 20 | do | 30 | 4.2 |
| 21 | do | 30 | 5.6 |

An additional series of latex emulsion paints stabilized with vegetable protein were made similar to Example 6 with the exceptions that the paint latex used was substituted in accordance with the notations of the following examples, and after the incorporation of the latices, a quantity of formaldehyde of 1.2 parts were intermixed in alternate examples, holding one example as a control.

Example 22—Polyalkylacrylate paint latex emulsion +aldehyde.

Example 23—Polyalkylacrylate control (AC-33 of Rohm & Haas).

Example 24—Styrene-butadiene latex+aldehyde.

Example 25—Control—no aldehyde (Dow 512-K).

Example 26—Styrene-butadiene latex (Dow 762-K) +aldehyde.

Example 27—Control—(Dow 762-K), no aldehyde.

In each of the above sets of example, e.g., the test material and control, where necessary the viscosity of the control paint was adjusted, usually by addition of water to a comparable level to the test material when freshly made. Thereafter, the paints were filled out into appropriate closable containers, closed, aged overnight, and placed in an oven at 125° F. for accelerated age test. Periodically the viscosity was determined at 25° C.+1° after a conditioning stirring for ten minutes with a laboratory mixer. Viscosity in centipoises was determined with a Brookfield Syncroelectric viscometer model RVF at 20 r.p.m. Viscosity in seconds was determined with a Sherwin-Williams cup fitted with a No. 4 Ford cup orifice.

Results obtained are set forth in the following Table I.

EXAMPLE 28

292.5 parts pigment dispersion of Example 1
90.9 parts 11% solution of animal glue in water
192.5 parts 67% styrene–33% butadiene emulsion copolymer were incorporated, along with essential preservatives, to make an emulsion paint as in Example 6.

1.2 parts 40% formaldehyde solution were added subsequent to the latex addition.

EXAMPLE 29

Same as Example 28, but the formaldehyde solution was omitted. Viscosity stability tests were run on Examples 28 and 29 as reported in Table I.

EXAMPLE 30

292.5 parts pigment dispersion of Example 1
58.8 parts 17% casein dispersion in water
192.5 parts 67% styrene–33% butadiene emulsion copolymer were incorporated together, along with essential preservatives to produce a latex emulsion paint. To this were added 1.2 parts 40% formalin solution subsequent to the latex addition.

EXAMPLE 31

Same as Example 30, except that the formalin addition was ommitted. See Table I for test results.

EXAMPLE 32

A series of 6 latex emulsion paints were made in duplicate using the solutions of Example 5 of synthetic protective colloids in a similar manner to that of Example 6, in lieu of the vegetable protein. Upon storage at 125° F. over 1000 hours' time, all those made without aldehydes present, or in the first six paints, increased in viscosity upon ageing. A second set of the 6 containing from .6 part to 2.4 parts of 40% formaline did not increase in viscosity with age, and held a practical viscosity range over the described test period.

EXAMPLE 33

A protein solution was made as described in Example 3, but 6.5 parts of 37% formaldehyde solution are added to the protein dispersion.

EXAMPLE 34

A protein solution was prepared as in Example 4, but 6.5 parts of 37% formaldehyde are added to the protein dispersion.

EXAMPLE 35

A protein solution was prepared as in Example 2 using a protein sold under the trade name of Buckeye "Pro-Cote."

3.25 parts 37% formaldehyde were added to one-half, and identified as Example 35a and a second half aliquot portion (35b) was left without aldehyde addition.

EXAMPLE 36

An oil-modified latex emulsion paint was made by dispersing together:

50 parts lithopone
250 parts rutile titanium dioxide
40 parts mica
100 parts clay
175 parts potein solution (as in Example 3)
2 parts tetrasodium pyrophosphate
3 parts sodium salt of an alkyl aryl sulfonate (Nacconol NRSF)
50 parts heat bodied linseed oil
3 parts cobalt naphthenate drier
4 parts pine oil
160 parts water Into this dispersion was added 300 parts of a 67% styrene–33% butadiene emulsion copolymer latex of about 45% solids content (Dow 762-W paint latex).

EXAMPLE 37

Same as Example 36, but prior to incorporation of the paint latex 2.5 parts of 37% formaldehyde were added to the latex.

EXAMPLE 38

An oil-modified alkyd latex emulsion paint was prepared by first dispersing together:

200 parts rutile titanium dioxide
100 parts clay
100 parts pigment (65% CaCO$_3$–35% diatomaceous earth)
190 parts aqueous protein dispersion of Example 3
2 parts tetrasodium pyrophosphate
3 parts sodium alkyl aryl sulfonic acid (Nacconol NRSF)
25 parts oil modified alkyd resin, 100% solids
3 parts cobalt naphthenate drier
4 parts pine oil After thorough dispersion of the above components, 360 parts of a high styrene-butadiene latex, as in Example 36, were incorporated in the pre-formed paint emulsion system.

EXAMPLE 39

Same as Example 38, but 2.2 parts of 37% formaldehyde were added to the 360 parts latex before incorporation of the latex in the emulsion paint system.

EXAMPLE 40

Same as Example 36, except 3 parts of 37% formaldehyde are added to the completed paint immediately after the paint latex addition.

EXAMPLE 41

Same as Example 40, but the priorly used paint latex was substituted for with an equal quantity of Firestone Butaprene F-5 latex.

EXAMPLE 42

Same as Example 41, except the aqueous protein dispersion contained therein was that of Example 33 (e.g. contained formaldehyde.

EXAMPLE 43

A straight, or unmodified latex emulsion paint was prepared by dispersing together:

200 parts rutile titanium dioxide
100 parts kaolin
100 parts pigment (65% $CaCO_3$–35% diatomaceous earth)
190 parts protein solution of Example 3
2 parts tetrasodium pyrophosphate
3 parts sodium salt alkyl aryl sulfonate (Nacconol NRSF)
10 parts sulfonated tallow
4 parts pine oil
105 parts water To the above dispersion were added 415 parts of 67% styrene; 33% butadiene emulsion copolymer paint latex.

EXAMPLE 44

As in Example 43, but 2.2 parts 37% formaldehyde solution added to paint latex before incorporation in the pigment dispersion.

EXAMPLE 45

Same as Example 44, but replacing the vegetable protein solution with an equivalent dry weight of casein in an aqueous alkaline casein dispersion.

EXAMPLE 46

Same as Example 38, except the protein dispersion of Example 3 was replaced with that of Example 4.

EXAMPLE 47

Same as Example 46, except 2.2 parts of 37% formaldehyde were added to the emulsion paint immediately after the paint latex addition and incorporation.

EXAMPLE 48

Same as Example 38, but replacing the protein dispersion of Example 3 with the protein dispersion of Example 35b. Results in a similar example utilizing protein solutions 35a were not materially different in viscosity stability.

EXAMPLE 49

Same as Example 48, but 2.2 parts of 37% formaldehyde solution were added to the emulsion paint within fifteen minutes after addition of the paint latex to the pigment dispersion.

EXAMPLE 50

200 parts rutile titanium dioxide
100 parts kaolin
100 parts pigment (65% $CaCO_3$–35% diatomaceous earth)
240 parts aqueous protein dispersion of Example 3
2 parts tetrasodium pyrophosphate
4 parts sodium salt of alkyl aryl sulfonate (Nacconol NRSF)
100 parts 100% solids oil-modified alkyd resin varnish
3 parts cobalt naphthenate drier
4 parts pine oil are thoroughly mixed together using small additional increments of water if necessary. The admixture is then passed through a zone of high shear, such as obtained in a colloid mill; 250 parts water (minus that previously referred to) are then used to thin down the paste.

EXAMPLE 51

Same as in Example 50, but 3 parts of 37% formaldehyde were incorporated after emulsification of the oil-modified alkyd resin into the paint system.

EXAMPLE 52

Same as in Example 50, but replacing the oil-modified alkyd resin solids with an equivalent quantity of heat-bodied linseed oil.

EXAMPLE 53

As in Example 52, but after thorough emulsification of the drying oil, 3.5 parts of 37% formaldehyde are incorporated into the paint.

EXAMPLE 54

Same as Example 36, but the aqueous protein dispersion of Example 3 is replaced with the protein dispersion of Example 33.

The above examples were subjected to age tests wherein the viscosity was determined at comparative times. The results of these tests are reported in Tables I and II which follow:

TABLE I

| Ex. No. | Code Ident. | Initial Visc. | | O'Nite Vis. Room Temp. | | 120 hrs. Room Temp. | | 600 hrs. Room Temp. | | 1,000 hrs. Room Temp. | | 120 hrs. 125° F. | | 600 hrs. 125° F. | | 1,000 hrs. 125° F. | |
|---|---|---|---|---|---|---|---|---|---|---|---|---|---|---|---|---|---|
| | | cps. | Sec. | cps. | Sec. | cps. | Sec. | cps. | Sec. | cps. | Sec. | cps. | Sec. | cps. | Sec. | cps. | Sec. |
| 6a [1] | 1572 | 2,260 | 9.5 | 2,500 | 11.5 | | | | | | | 1,090 | 5.5 | 370 | 3.5 | 320 | 3.5 |
| 7 | 1590 | 2,030 | 8.5 | 1,660 | 7 | 1,770 | 6.5 | 1,560 | 6.5 | 1,570 | 6.5 | 1,580 | 6.5 | 1,590 | 6 | 1,550 | 6.5 |
| 8 | 1591 | 1,640 | 6 | 1,420 | 5.5 | 1,500 | 5.5 | 1,380 | 5 | 1,380 | 5.5 | 1,520 | 5.5 | 1,350 | 5 | 1,360 | 5 |
| 9 | 1592 | 1,630 | 6 | 1,580 | 5.5 | 1,650 | 6 | 1,600 | 6 | 1,570 | 6 | 1,680 | 5.5 | 1,290 | 5 | 1,240 | 4.5 |
| 10 | 1593 | 1,510 | 5.5 | 1,520 | 5.5 | 1,570 | 5.5 | 1,510 | 5.5 | 1,530 | 6 | 1,670 | 5.5 | 1,210 | 4.5 | 1,120 | 4 |
| 6b [1] | 1612 | 5,100 | 28 | 5,150 | 26.5 | 4,750 | 28 | 3,820 | 24 | | | 2,940 | 19 | 930 | 5 | 960 | 5 |
| 11 | 1728 | 3,290 | 23 | 2,640 | 14 | | | | | | | 3,040 | 17.5 | 2,920 | 13.5 | 2,840 | 13 |
| 12 | 1729 | 3,520 | 28 | 3,000 | 23 | | | | | | | 3,240 | 20 | 3,090 | 17 | 2,850 | 17 |
| 13 | 1747 | 2,770 | 17.5 | 2,520 | 15.5 | | | | | | | 3,030 | 22.5 | 2,420 | 13.5 | 1,870 | 9.5 |
| 6b [1] | 1612 | 5,100 | 28 | 5,150 | 26.5 | 4,750 | 28 | 3,820 | 24 | | | 2,940 | 19 | 930 | 5 | 960 | 5 |
| 14 | 1722 | 4,410 | | 5,200 | 30+ | | | | | | | 2,580 | 18.5 | 970 | 5.5 | 910 | 5.5 |
| 15 | 1613 | 2,250 | 14 | 1,960 | 11 | | | | | | | 2,030 | 9.5 | 1,960 | 8.5 | 2,120 | 9 |
| 16 | 1614 | 2,240 | 11 | 2,050 | 11 | | | | | | | 2,160 | 11 | 1,910 | 10.5 | 1,820 | 7 |
| 6c [1] | 1748 | 5,950 | | 5,950 | | | | | | | | 3,100 | 28 | 1,120 | 5.5 | 1,060 | 5 |
| 17 | 1733 | 2,520 | 16 | 2,410 | 14 | | | | | | | 2,460 | 13.5 | 1,800 | 8 | 1,350 | 7.5 |
| 18 | 1594 | 4,520 | 25 | 2,230 | 9.5 | 2,060 | 8 | 2,010 | 8 | 1,880 | 7.5 | 1,880 | 7 | 1,620 | 6 | 1,470 | 5.5 |
| 19 | 1595 | 5,600 | 26 | 2,290 | 9.5 | 2,420 | 10.5 | 2,490 | 11.5 | 2,390 | 9.5 | 2,320 | 9.5 | 2,220 | 9.5 | 1,830 | 8.0 |
| 20 | 1596 | 6,000 | 23.5 | 2,440 | 11 | 2,700 | 13.5 | 2,800 | 13.5 | 3,060 | 15 | 3,030 | 15 | 2,840 | 13 | 2,440 | 10.5 |
| 21 | 1597 | 6,600 | | 2,560 | 14 | 2,780 | 14.5 | 3,520 | 21 | 3,740 | 21 | 4,180 | 25 | 4,160 | 22.5 | 3,320 | 19 |
| 6b [1] | 1612 | 5,100 | 28 | 5,150 | 26.5 | 4,750 | 28 | 3,820 | 24 | | | 2,940 | 19 | 930 | 5 | 960 | 5 |
| 23 | 1588 | 2,910 | 13 | 2,340 | 9.5 | | | | | | | 1,300 | 5 | 1,060 | 4 | | |
| 22 | 1636 | 2,700 | 10 | 2,460 | 9.5 | | | | | | | 1,770 | 6.5 | 1,910 | 6.5 | 1,600 | 5.5 |
| 25 | 1384 | 2,490 | 15 | 1,620 | 8 | | | | | | | 302 | 3.5 | 105 | 3 | | |
| 24 | 1637 | 2,340 | 9 | 1,880 | 6.5 | | | | | | | 1,740 | 6 | 2,000 | 7 | 1,910 | 7 |
| 27 | 1572 | 2,260 | 9.5 | 2,500 | 11.5 | | | | | | | 1,090 | 5.5 | 370 | 3.5 | 320 | 3.5 |
| 26 | 1633 | 2,180 | 9 | 1,880 | 7.5 | | | | | | | 1,710 | 6.5 | 1,840 | 7 | 1,880 | 7.0 |
| 29 | 1663 | 3,070 | 25.5 | 3,360 | 38 | | | | | | | 910 | 7 | 460 | 4.5 | 400 | 4 |
| 28 | 1664 | 4,950 | 30+ | Livered | | | | | | | | | | | | | |
| 31 | 1716 | 1,670 | 9 | 1,430 | 9.5 | | | | | | | 2,180 | 19 | 2,520 | 20 | 1,850 | 13 |
| 30 | 1715 | 1,570 | 7.5 | 1,010 | 5 | | | | | | | 700 | 4 | 326 | 3.5 | 400 | 3.5 |

[1] Control formulas.

TABLE II

| Example Number | Original Viscosity, S-W, Cup. Sec. | Viscosity—Seconds after accelerated Ageing at 125° F. for No. hours stated | | | | | |
|---|---|---|---|---|---|---|---|
| | | 168 | 336 | 504 | 672 | 840 | 1000 |
| 36 | 11 | 4 | 3.5 | | | | |
| | | (Control—No Aldehyde) | | | | | |
| 37 | 11 | 8.5 | 7 | | | | |
| | | (Aldehyde in latex) | | | | | |
| 38 | 14 | 5 | 3.5 | | | | |
| | | (Control—Alkyd—No Aldehyde) | | | | | |
| 39 | 14 | 10 | 12 | 11 | 11 | 10 | 13 |
| | | (Example 38 + Aldehyde in Latex) | | | | | |
| 40 | 14.5 | 10.5 | 8 | 8 | 7 | 7 | 7 |
| | | (Example 36 + Aldehyde) | | | | | |
| 41 | 16 | 11 | 10 | 10 | 10 | 9 | 9 |
| | | (Butaprene Latex + Aldehyde) | | | | | |
| 42 | 13 | 7 | 5.5 | 4.5 | | | |
| | | (Pre-mix—Aldehyde + Protein Disp.) | | | | | |
| 43 | 18 | 5 | 3.5 | | | | |
| | | (Control—Straight Latex paint) | | | | | |
| 44 | 18.5 | 18.5 | 19 | 19 | 20 | 23 | 23 |
| | | (Example 43 + Formaldehyde) | | | | | |
| 45 | 14 | 5 | 4 | 3.5 | | | |
| | | (Casein + Latex containing Aldehyde) | | | | | |
| 46 | 15.5 | 8 | 5 | 4 | | | |
| | | (Control—Glidden "Alpha" Protein) | | | | | |
| 47 | 9.5 | 8 | 8 | 7.5 | 8 | 7.5 | |
| | | (Example 46—Aldehyde added after latex) | | | | | |
| 48 | 11 | 6 | 5 | 3.5 | | | |
| | | (Control—"Pro-Cote" Protein) | | | | | |
| 49 | 9.5 | 7 | 6 | 6 | 6 | 6 | |
| | | (Example 48—Aldehyde added after latex) | | | | | |
| 50 | 19 | 4 | 3.5 | | | | |
| | | (Control—Alkyd Emulsion Paint) | | | | | |
| 51 | 18 | 5 | 4 | | | | |
| | | (Example 50 + Aldehyde addition) | | | | | |
| 52 | 13.5 | 5 | | | | | |
| | | (Control—Drying Oil Emulsion Paint) | | | | | |
| 53 | 16 | 6 | | | | | |
| | | (Example 52—plus Aldehyde) | | | | | |
| 54 | 11 | 4 | 3.5 | | | | |
| | | (Example 36—Aldehyde in Protein) | | | | | |

Having thus described our invention, we claim:

1. A method of stabilizing the viscosity of emulsion paints whose essential components are a pigment, a paint latex consisting essentially of an oil-in-water emulsion copolymer of a major proportion of a monovinyl aromatic hydrocarbon containing but a single reactive center of polymerization and a minor proportion of a conjugated diolefine, said paint latex constituting the principal non-volatile binder vehicle for the pigment component; and an aqueous dispersion of a vegetable protein having a pH above 7 as a major proportion of the protective colloid and which constitutes but a minor proportion of the non-volatile vehicle binder of said paint system said method comprising incorporating into said components during emulsion paint manufacture a quantity of from about 1% to about 12% based on the weight of the dry vegetable protein present in the emulsion paint of a water-soluble aliphatic aldehyde containing not more than 5 carbon atoms by adding said quantity of said aldehyde in the time order of the emulsion paint manufacture such that the aqueous protein solution has been added and incorporated prior to the aldehyde addition and said quantity of said aldehyde is added not earlier than concurrently with the first increment of addition of said paint latex to said protein but said quantity of said aldehyde is added not later than before incorporation of the other aldehyde binding components to the paint system.

2. The method of claim 1 where the vegetable protein is soya bean protein.

3. The method of claim 1 where the aldehyde is formaldehyde.

4. The method of claim 1 where the aldehyde is paraformaldehyde.

5. The method of claim 1 where the aldehyde is glyoxal.

6. The method of claim 1 where the aldehyde is acetaldehyde.

7. The method of claim 1 where the aldehyde is propionaldehyde.

8. The method of claim 1 where the vegetable protein is soya bean protein and the aldehyde is formaldehyde.

9. The method of claim 1 where the vegetable protein is soya bean protein and the aldehyde is paraformaldehyde.

10. The method of claim 1 where the vegetable protein is soya bean protein and the aldehyde is glyoxal.

11. The method of claim 1 where the vegetable protein is soya bean protein and the aldehyde is acetaldehyde.

12. The method of claim 1 where the vegetable protein is soya bean protein and the aldehyde is propionaldehyde.

13. The method of claim 1 wherein the paint latex consists essentially of an oil-in-water emulsion polymer containing not more than about 67 mol percent of a monovinyl aromatic hydrocarbon having a single center of polymerization and not more than 60 mol percent of an aliphatic conjugated diolefine.

14. The method of claim 1 wherein the aldehyde is formaldehyde and is present in an amount from 1 percent to 10 percent by weight of the dry protein.

15. The method of claim 1 wherein the aldehyde is formaldehyde and the quantity is from 2 to 5 percent by weight of the dry protein.

16. The method of claim 1 wherein the aldehyde is acetaldehyde and is present from about 5 to 10 percent by weight of the dry protein.

17. The method of claim 1 wherein the aldehyde is glyoxal and the amount is from about 4 to not more than 8 percent by weight of the dry protein.

18. The method of claim 1 wherein the aldehyde is paraformaldehyde and the quantity is from 1 to 10 percent by weight of the dry protein.

19. The method of claim 1 wherein the aldehyde is glyoxal and the quantity is from 1 to 10 percent by weight of the dry protein.

20. The method of claim 1 wherein the aldehyde is acetaldehyde and the quantity is from 1 to 10 percent by weight of the dry protein.

21. The method of claim 1 wherein the aldehyde is propionaldehyde and the quantity is from 1 to 10 percent by weight of the dry protein.

22. The method of claim 1 wherein the amount of aldehyde is from 2 to 5 percent by weight of the dry vegetable protein.

References Cited in the file of this patent

UNITED STATES PATENTS

| | | |
|---|---|---|
| 2,335,405 | Geer | Nov. 30, 1943 |
| 2,453,752 | La Piana et al. | Nov. 16, 1948 |
| 2,461,070 | McKinney | Feb. 8, 1949 |
| 2,500,144 | Beck | Mar. 14, 1950 |
| 2,510,257 | Robinson | June 6, 1950 |
| 2,662,866 | Bristol et al. | Dec. 15, 1953 |
| 2,683,700 | Gehring | July 13, 1954 |

OTHER REFERENCES

Parker: Official Digest, September 1952, pages 620–625.